United States Patent [19]

Palmroos et al.

[11] Patent Number: 5,684,097
[45] Date of Patent: Nov. 4, 1997

[54] PROCESS FOR PREPARING POLYETHYLENE

[75] Inventors: Ari Palmroos, Kerava; Ali Harlin, Vantaa; Antero Ahvenainen, Porvoo, all of Finland; Jouni Takakarhu, Lyngby, Denmark; Aimo Sahila, Keraya, Finland

[73] Assignee: Borealis Polymers OY, Porvoo, Finland

[21] Appl. No.: 475,842

[22] Filed: Jun. 7, 1995

[30] Foreign Application Priority Data

Dec. 16, 1994 [FI] Finland .................. 945926

[51] Int. Cl.$^6$ .................................. C08F 2/34
[52] U.S. Cl. .............................. 526/64; 526/65
[58] Field of Search ................... 525/53, 65, 64

[56] References Cited

U.S. PATENT DOCUMENTS

| | | | |
|---|---|---|---|
| 3,514,501 | 5/1970 | Leibson et al. | 526/65 |
| 3,622,553 | 11/1971 | Cines | 526/65 |
| 4,187,278 | 2/1980 | Clifford | 526/65 |
| 4,291,132 | 9/1981 | Clifford | 525/53 |
| 4,309,521 | 1/1982 | Sato et al. | 526/114 |
| 4,336,352 | 6/1982 | Sakurai et al. | 525/240 |
| 4,368,291 | 1/1983 | Frese et al. | 525/53 |
| 4,368,304 | 1/1983 | Sato et al. | 526/114 |
| 4,740,550 | 4/1988 | Foster | 525/53 |
| 5,326,835 | 7/1994 | Ahvenainen et al. | 526/64 |
| 5,494,965 | 2/1996 | Harlin et al. | 525/53 |

FOREIGN PATENT DOCUMENTS

| | | |
|---|---|---|
| 0446059 | 9/1991 | European Pat. Off. . |
| 0580930 | 2/1994 | European Pat. Off. . |
| 942949 | 6/1994 | Finland . |
| 1532231 | 11/1978 | United Kingdom . |
| 9501831 | 1/1995 | WIPO . |

*Primary Examiner*—Thomas R. Weber
*Attorney, Agent, or Firm*—Steinberg, Raskin & Davidson, P.C.

[57] ABSTRACT

A process for producing polyethylene compositions in the presence of a catalytic system of ethylene polymerizing catalyst and cocatalyst in a multistage continuous reaction sequence consisting of successive liquid phase and gas phase polymerizations is disclosed. In the first step of the process, ethylene and optionally hydrogen and comonomer are polymerized in a first loop reactor in a low boiling hydrocarbon medium in the presence of ethylene polymerizing catalyst and cocatalyst. The reaction mixture is then removed and then transferred to a second loop reactor where polymerization is continued by adding ethylene, hydrogen and optionally inert hydrocarbon, comonomers and cocatalysts. Thereafter, the reaction mixture is removed from the second loop reactor along with an essential part of the reaction medium and transferred to a gas phase reactor where polymerizing is continued in the presence of added ethylene and optionally hydrogen, comonomers and cocatalysts to form an end product. The residence time and reaction temperature being such that the proportion of the ethylene polymer produced in the first loop reactor to the end product of the process is between 1–20%.

14 Claims, 1 Drawing Sheet

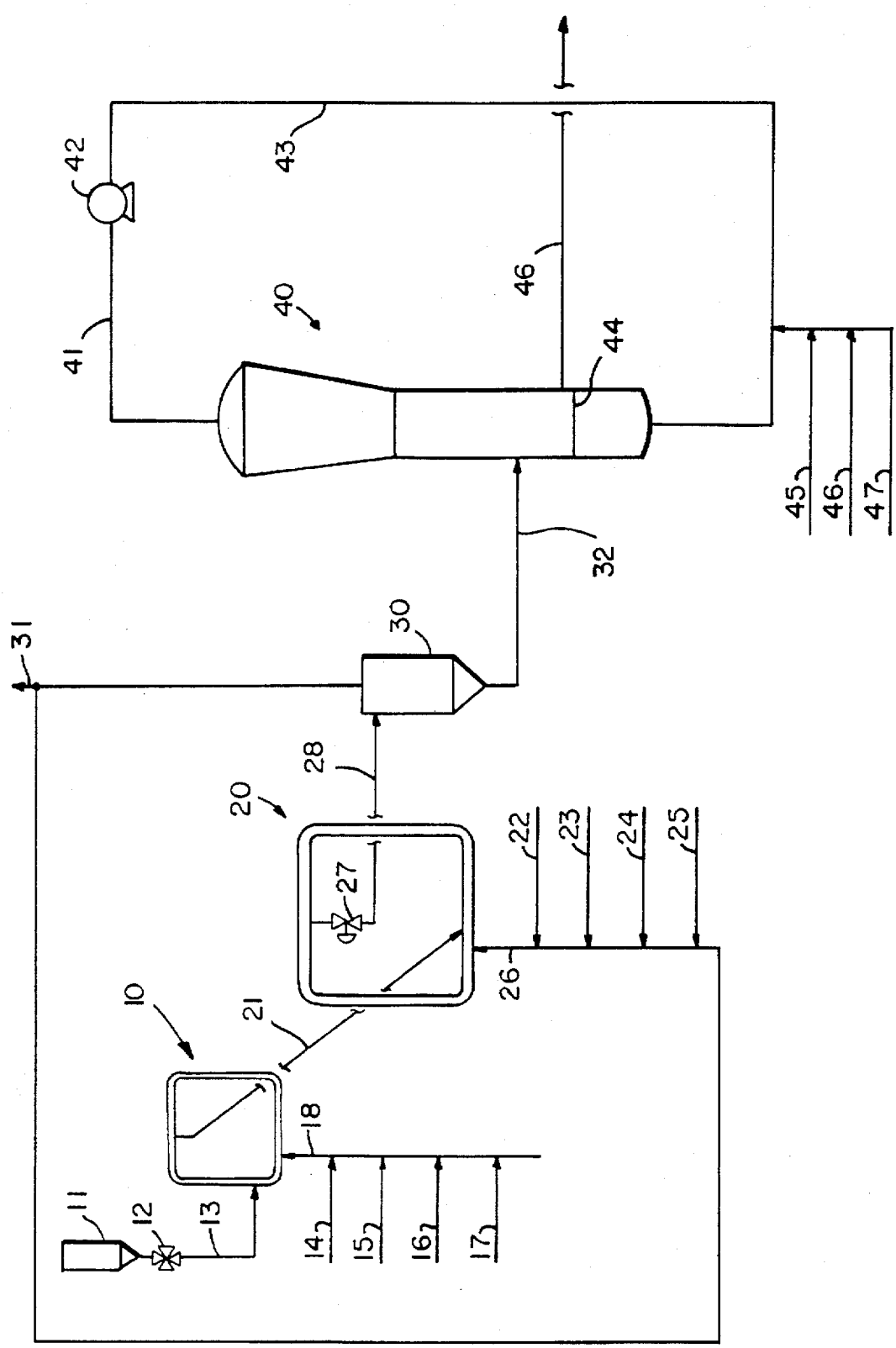

1

PROCESS FOR PREPARING POLYETHYLENE

BACKGROUND OF THE INVENTION

The invention relates to a process for preparing polyethylene, which has improved physical properties. Particularly, the invention concerns continuous multistage process for manufacturing a polyethylene having a multimodal and/or broad molecular weight distribution. The multistage process is applicable for preparing strong pipe materials and cable insulating materials having a good stress cracking strength, for preparing film grades having a good appearance and low gel amount and for making blown products such as bottles. Generally the strength properties of polyethylene materials depend on molecular weight. The greater the molecular weight is, the greater are elasticity, stiffness and creep properties. In certain applications, like manufacturing films, bottles, cable coatings and pipes with extrusion and blowing methods, polyethylene having a high molecular weight and narrow molecular weight distribution is not satisfactory because of its bad flowing properties and bad processability. That is why different ways of manufacturing polyethylene having broad molecular weight distribution have been proposed. One way of broadening the molecular weight distribution is to mix polyethylene fractions of low and high molecular weight either mechanically or in a solution. However, with mechanical mixing it is difficult to get a product that is homogeneous enough. In solution mixing expensive equipments will be needed, so these methods are either uneconomical or unsatisfactory.

It has also been suggested to obtain the broadening of molecular weight distribution by choosing suitable catalysts. However, broadening of the molecular weight distribution is rather limited in this way. The activity of the catalysts also tends to fall quickly and therefore it will be necessary to remove the catalytic residues from the product by washing, which makes the process uneconomical.

Two stage processes for broadening the molecular weight distribution by using different hydrogen concentrations are known. The processes are conducted by either polymerizing in a high hydrogen concentration in the first stage and in a low hydrogen concentration in the second stage, or vice versa. In the first stage it is necessary to remove the unreacted gases and the hydrogen after the first stage. In the latter case the common Ziegler-catalysts tend to loose their activity during the polymerization in the first stage. The rate of polymerization, which is first high, decreases in the second stage because of the lowered activity of the catalyst and high hydrogen concentration. Because of this the residence time in the second reactor becomes much longer than in the first reactor. This means a bigger reactor size in the second stage is required and more difficult control of the whole process is observed.

It is well known to use different polymerization methods in the two stage processes. Known two-stage processes are for instance liquid phase-liquid phase processes, gas phase-gas phase processes and liquid phase-gas phase processes. The present invention relates in such multistage process, where it is applied both liquid phase liquid phase and liquid phase-gas phase polymerization. An example of the liquid phase-liquid phase polymerizing is described in for instance EP 580 930, where two successive loop-reactors are used. As an example of the liquid phase-gas phase polymerizing process GB 1 532 231, U.S. Pat. No. 4,368,291, U.S. Pat. No. 4,309,521, U.S. Pat. No. 4,368,304 and FI 86 867 are mentioned. The latter publication specifically concerns a process where a polyethylene having a bimodal and/or a broad molecular weight distribution is manufactured by a combination of a loop-reactor and gas phase reactor. In the first reaction step there is fed into the loop reactor ethylene, catalyst and cocatalyst and inert low boiling hydrocarbon and advantageously hydrogen for polymerizing ethylene, the residence time in the reactor being at least 10 minutes, at least an essential amount of the reaction medium is separated and the polymer is moved to one or several gas phase reactors, where the polymerization is completed in the presence of ethylene and optionally hydrogen or comonomer.

The present invention relates to a such continuous multistage process for polymerizing the ethylene, which contains the sequence of three successive polymerizing reactors. It is well-known and proposed in different publications to use three-stage processes, where solution, suspension or gas phase polymerization are applied. Generally these kind of publications contain the teaching that in all stages the same kind polymerization or that the successive polymerizing stages are carried out all in the same reactor. As an example U.S. Pat. No. 4,336,352, which primarily concerns polyethylene compositions consisting of three different polyethylenes. In the publication it is however presented a possibility of using different three stage processes for manufacturing the composition. One alternative presented contains a sequence, where in the first stage polyethylene having a very high average molecular weight, e.g. 400,000–6,000,000 and density between 940–980 kg/m$^3$ is polymerized and the proportion of this fraction to the end product is 1–10%. In the next polymerization stage polyethylene having an average molecular weight of 1000–100,000 and a density between 940–980 kg/m$^3$ is produced. In the third polymerization step polyethylene having an average molecular weight of 100,000–1,000,000 and a density of 900–970 kg/m$^3$ is produced. In this publication it is disclosed that the polymerization can be carried out by using suspension polymerization, solution polymerization or gas phase polymerization, but not that in different polymerization stages different ways of polymerizing could be used. In the examples suspension polymerization is shown.

Generally it can be stated that any multistage process provides more or less the same type of products. Besides the choice of the catalyst, the product properties are affected by the reaction conditions which effect the activity properties and morphology properties of the catalysts as well as to the morphology properties of the product fractions. The choice of process conditions is limited essentially by the chosen process configuration and the reactor types being applied. Particularly it has to be noted that different types of end products, like blow casting products, film and pipe products often require different kinds of properties and the achievement of these all is difficult according to the known technique.

That is why there is a need for such a multistage process which a multimodal and/or a broad molecular weight distribution polyethylene for very broad product choice can be produced.

SUMMARY OF THE INVENTION

According to the invention it has been found that the disadvantages and shortcomings in well-known two- or multistage processes for polymerizing polyethylene in trying to produce polyethylene with multimodal and/or broad molecular weight distribution for a very broad product selection can be avoided by using a certain kind of combination of three successive reactors, in each of which the polymerization of ethylene is carried out in certain circumstances.

Thus the invention concerns a continuous process for preparing polyethylene compositions in the presence of a catalyst system formed of an ethylene polymerizing catalyst and cocatalyst in a multistage reaction sequence, which comprises successive liquid phase and gas phase polymerizations. The process according to the invention contains at least one reaction sequence, in which in the first step ethylene and optionally hydrogen and comonomer is polymerized in a loop reactor in a low boiling hydrocarbon medium in the presence of ethylene polymerizing catalyst and cocatalyst. The residence time and the reaction temperature are such that the proportion of the ethylene polymer forming in the reactor from the end product is between 1–20%, the reaction mixture leaving from the step is transferred to a second step, where the polymerization is continued in a loop reactor by adding ethylene, hydrogen and optionally inert hydrocarbon, comonomers and cocatalyst the delay time being at least 10 minutes. The reaction mixture is removed from the loop reactor and at least an essential part of the reaction medium is removed and the polymer is transferred to a third step, where polymerization is completed in a gas phase reactor in the presence of added ethylene and optionally hydrogen, comonomers and cocatalyst.

Thus the process according to the invention can be from one point of view considered to consist of three-stage sequence formed, one after another, from a loop reactor, a loop reactor and a gas phase reactor, in each of which it will be operated in certain circumstances. This kind of three stage sequence and the advantages of it has not been described in any earlier publication in this field.

BRIEF DESCRIPTION OF THE DRAWINGS

FIG. 1 is a schematic representation of a process in accordance with the present invention.

DETAILED DESCRIPTION

The process according to the invention can from another point of view be considered to consist of a two-stage process which include a loop reactor and one or several successive gas phase reactors. The feed of the first loop reactor comprises, besides the ordinary inert hydrocarbon, monomers and hydrogen, ethylene polymer, which has been produced in a separate loop reactor in certain circumstances and in a certain way. According to the invention it has been found that the operation of this process and the properties of the arising polymer can be further improved, when a polymer polymerized in a different loop reactor in certain circumstances is fed to the loop reactor.

A number of advantages will be gained with the process according to the invention. First, with the process, a high flexibility to prepare polymers with different kind of molecular structure and a way of adjusting the products to fulfill the demands of different usages are obtained. By means of the process the activity profiles of the catalyst can be optimized in different reaction stages. Further by means of the process, the morphology properties of both the product to be fed into the gas phase reactor and the end product can be optimized. The usage of the loop reactor makes possible high production rates in short residence time due to a good heat transfer and mixing effect but the distribution of the residence time is broad. Normally as a result of this a part of the catalyst is released nearly unreacted to the gas phase reactor, where it will react to form a very large molecular weight product, with problems for instance such as high gel contents. In the process according to the invention it is possible to get a remarkable narrowing in the residence time distribution of the polymer particles, which leads to more homogeneous end products, because the polymer particles react in different stages of the process with each other more or less in the same way. Further in the loop reactor preceding the gas phase reactor a polymer fraction having a very high melt index can be prepared by using large quantities of hydrogen. Known processes on the other hand encounter operational problems of the loop reactor due to the high hydrogen content causing, remarkable growing of the amount of the fines and further troubles in the operation of the gas phase reactor and the product handling systems and deteriorations in the properties of the end product. In the process according to the invention to the loop reactor of the second step polymerization, however, a polymer fraction with a relatively high molecular weight is fed, whereby in the loop reactor of the second step the amount of fines do not essentially grow in spite of producing in this stage a fraction having a high melt index and a low molecular weight. Essential for the optimal operation of the process is that the reactor of the first step is specifically a loop reactor and the product fraction having the smallest volume will be produced in the first reaction step. These and other advantages obtained by the process will be described later in the detailed description of the process.

Thus, the first step of the process according to the invention is the loop reactor polymerization, in which ethylene is polymerized in low boiling hydrocarbon medium in the presence of the ethylene polymerizing catalytic system. Characteristic to this step is that the reaction conditions are chosen in a certain way for achieving certain product properties and that all of the reaction suspension is fed to the loop reactor of the second step polymerization without the separation of the medium and the monomers or the hydrogen.

Thus the reaction conditions, particularly temperature and pressure conditions, residence time and optionally the amount of hydrogen to be fed are chosen so that the amount of the product produced in the first stage reactor is in certain limits and that the product has certain properties.

First, essential to this step is that the polymer will be produced in a relatively small amount, that is 1–20 weight percent (wt %), preferably 5–15 wt % of the amount of the end product. This makes it possible to get favorable conditions to the second step loop reactor polymerization and additionally due to the reactor order the reactor size required can be essentially smaller than in the subsequent (second) loop polymerization. Additionally, it is essential that the first step reactor is particularly a loop reactor whereby the product transfer to the next loop reactor can be made only based on pressure difference and no product transform systems will be needed, like for instance in that ease that the gas phase reactor would be used as the first reactor.

Secondly, it is essential that the melt index of the polymer produced in the first step loop reactor is lower than the melt index of the product produced in the next loop reactor. This can be achieved in a well known way by limiting the amount of the hydrogen fed to the reactor, if any. This is particularly advantageous in the case that in the loop reactor of the second step of the process when very high hydrogen amounts are used, which is possible according to the process of the Finnish patent FI 86867, in which a product having a very high melt index and a low molecular weight is produced. This kind of polymer is relatively brittle and hence in the loop reactor of the second step polymerization step higher amount of fines than desired could be produced which are harmful to the operation of the gas phase reactor and the functionality of the product handling system.

In the process according to the invention these disadvantages will thus be eliminated so that in the first loop reactor a polymer is produced having the melt index lower than the melt index of the polymer produced in the latter loop reactor. This kind of polymer holds together better and produces less fines. By feeding this polymer to the latter loop reactor the polymerization will continue without the amount of the fine particles growing too high from the point of view of the later process steps.

Thus, in the first reaction step the reaction conditions are chosen so that the melt index $MFR_2$ of the polymer produced is between 0.01–50, advantageously between 0.05–10. This can be expressed according to the invention also so that the mole mass of the polymer has to be within certain limits. According to the invention the molecular weight of the polymer formed in the first loop reactor is at least 25% of the molecular weight of the end product, but at most 5 times greater than the molecular weight of the end product. Advantageously in the first step loop reactor a polymer having a molecular weight between 150,000–600,000 and a density between 920–975 $kg/m^3$ is produced, advantageously greater than 940 $kg/m^3$.

In the first step loop reactor it is also possible, however, to produce ethylene polymer having added in the polymerization as a comonomer a small amount of $C_4$–$C_8$ alphaolefin in order to get the density of the component to the range 920–950 $kg/m^3$, advantageously to the range of 920–945 $kg/m^3$. This kind of copolymer added to the partial step formed of the second step loop reactor and the third step gas phase reactor will effect advantageously the comonomer distribution and the molecular weight distribution of the end product, whereby the stress cracking properties of the end product will be essentially improved. This kind of end product is excellent for instance for the purpose of the production of pipe products.

The comonomer used in the preparation of the copolymer can be any $C_4$–$C_8$ alphaolefin or their mixtures. The comonomer in question can be chosen from the group of 1-butene, 1-hexene, 4-methyl-1-pentene, 1-octene or their mixtures. The amount of the comonomer in the copolymer can be chosen from the range 0.5–10 w-%.

The reaction pressure in the first step loop reactor is chosen preferably to be greater than in the latter loop reactor. Thus the removal of the product from the loop reactor is as easy as possible, because the reaction mixture as a whole will be removed to the latter loop reactor from the higher pressure to lower pressure. Thus the reaction pressure can be chosen in relatively large ranges, for instance between 40–90 bar, preferably between 50–70 bar, however provided that the pressure is higher than in the next loop reactor. The removal to the next loop reactor can happen either periodically or continuously.

Also, the reaction temperature can be chosen within relatively large range, however considering the limitations related to the properties of the product and to the amount of the product.

Lower temperatures are used advantageously in the first loop reactor than in the second step loop reactor, so that it is possible to keep the activity of the catalyst in desired values. Thus it is possible to choose the reaction temperature in the first loop reactor within the range of 20°–100° C., advantageously within the range of 40°–80° C. The residence time of the polymer in the reactor can be chosen between 10 minutes and 2 hours, preferably between 0.5–1 hours.

In the first step loop reactor it is possible to use as a catalyst any catalyst suitable for preparation of ethylene polymers. Such are for instance the Ziegler catalysts, which contain transition metal from groups IV, V or VI of the Periodic system together with cocatalysts, usually with alkyl aluminium compositions. A recommendable transition metal is titanium and the catalysts can be supported, e.g. on inorganic support, like silica, alumina or silica-alumina. As catalysts it is also possible to use novel kinds of metallocene catalysts together with cocatalysts or without them.

Further, it is recommendable that the whole catalyst amount in the process be fed to the loop reactor of the first step polymerization reactor, whereby no extra catalysts will be fed to the loop reactor of the second step and to the following gas phase reactor. Instead it is possible to feed the cocatalyst either only to the preceding loop reactor or to the latter reactors and the cocatalysts fed to different reactors do not have to be same. The catalyst and the cocatalyst can be fed to the loop reactor either separately or combined.

Low boiling inert hydrocarbon is fed to the loop reactor as polymerizing medium. Examples of suitable hydrocarbons are aliphatic hydrocarbos like propane, butane, pentane and hexane. Advantageous hydrocarbons are especially propane and isobutane. It is also possible to use a mixture of one or more hydrocarbons mentioned before. The polymer suspension in an inert hydrocarbon produced in the loop reactor is fed without the separation of inert components and monomers periodically or continuously directly to the latter loop reactor, which acts in lower pressure than the previous loop reactor. In some cases it can be advantageous if before feeding to the second stage loop reactor at least part of the reactor medium, as possibly the hydrogen or comonomer used, will be removed before feeding to the second step loop reactor.

According to the invention the second and the third step of the process will form together a partial stage, which consists of a loop reactor and subsequent one or several gas phase reactor according to the Finnish patent F186867. In this partial step ethylene polymer, having a bimodal and/or a broad molecular weight distribution is produced so that in the loop reactor ethylene polymer fraction having a low molecular weight is produced and in the gas phase reactor or reactors a fraction having a high molecular weight is produced.

Thus, the reaction mixture is fed to the second step loop reactor from the first loop reactor containing active catalyst and cocatalyst, an inert medium, monomer and optionally hydrogen. In addition, to this reactor is fed fresh monomer, hydrogen, optional comonomer and optional cocatalyst. The loop reactor can be of conventional type including means for feeding the different feeding components to the reactor, means for circulating the polymer-hydrocarbon suspension through the reactor, the heat transfer means for removing the polymerization heat and means for removing the polymer suspension from the reactor and feeding to the subsequent gas phase reactor.

The polymerizing medium preferably used will be the same inert hydrocarbon as that in the second stage loop reactor, but not necessarily. Very suitable alternative mediums are, among others, propane and butane, especially propane.

The reaction mixture consisting of a reaction mixture from the first step loop reactor together with the added fresh monomer, hydrogen, optional comonomer and cocatalyst is circulated continuously through the reactor, whereby more suspension of polyethylene in particle form in a hydrocarbon medium will be produced. The conditions of the loop reactor will be chosen so that at least 20 wt %, but preferably 40–90 wt % polymerized in this whole production will be polymerized in this, second, loop reactor. The temperature can be chosen within the range of 75°–110° C. advantageously within the range 85°–100° C. The reaction pressure can be chosen within the range of 40–90 bar, preferably within the range or 50–65 bar, however provided that the reaction pressure is lower than the pressure of the previous loop reactor. The residence time must be at least 10 minutes, but preferably in the range of 1–2 hours. The molecular ratio of hydrogen to the ethylene will be chosen depending on the quality of the desired end product, but in the production of the bimodal or trimodal polyethylene it will be within the range of 0.1–1.

Special advantages will be gained, as disclosed in the Finnish patent F186867, if propane is used as an inert hydrocarbon and the reaction is carried out in conditions where the temperature and pressure are above equivalent critical points of the reaction mixture, which consists of ethylene, propane, hydrogen and a possible comonomer, but the temperature is however lower than the melting point of the forming polymer. That way the temperature in the loop reactor is preferably between 95°–110° C. and the pressure between 60–90 bar.

By using supercritical propane phase it is possible to use higher hydrogen concentrations than it would be possible in undercritical conditions. The solubility of the product is less and the separation of the hydrocarbon (propane) and hydrogen by means of flash technique is easier. In addition, even if very high hydrogen concentrations would be used, the amount of fines arising in this loop reactor is lower, because in the reactor the polymerization of the product produced in the first loop reactor is continued and has a better coherence.

In this loop reactor a low molecular weight fraction having preferably a molecular weight of 5000–50,000, the molecular weight distribution $M_w/M_n$ between 2.5–9 and the melt index $MFR_2$ between 10–2000 g/10 min is produced. Most preferably all of this component has a relatively high density, preferably between 950–980 kg/m³ and a high melt index $MFR_2$, preferably between 150–1500. Particularly by using propane as the inert hydrocarbon in this loop reactor and by carrying out the polymerization in supercritical conditions, it is possible to produce in the loop reactor a product having a very high melt index. Because of the preceding loop polymerization according to the invention the melt index can be raised to very high level without the above mentioned operational problems of the reactor and the morphology disadvantages in the end product. The proportion of the product of the end product removed the gas phase reactor or the last gas phase reactor is advantageously 40–80%.

The reaction mixture is removed either continually or periodically in an ordinary way from this loop reactor. An inert hydrocarbon mixture, the extra monomer and hydrogen are removed from the polymer particles in a conventional way, for example by flash technique and they can be circulated back either to the same loop reactor or to the previous loop reactor.

The concentrated polymer mixture is then fed to the gas phase reactor. This reactor can be an ordinary fluidized bed reactor, although other types of gas phase reactors can be used. In a fluidized bed reactor the bed consists of the formed and growing polymer particles as well as still active catalyst come along with the polymer fraction. The bed is kept in a fluidized state by introducing gaseous components, for instance ethylene on such flowing rate which will make the particles act as a fluid. The fluidizing gas can contain also inert carrier gases, like nitrogen and also hydrogen as a modifier.

It is also possible to introduce into the bed inert hydrocarbon diluent, such as propane. In such case the diluent can be introduced as liquid or gas or as both. The addition of liquid or gas can be carried out into the bottom of the gas phase reactor or straight into the polymer bed. In the latter embodiment it is possible to apply the mixing devices, such as mixer according to Finnish patent application 933073. In that publication it is disclosed a mixing device for fluid bed reactors, where at least part of the fluidizing gas is introduced into the reactor through a channel in the mixer. By this way it is possible to introduce into the polymer bed hydrocarbons also in liquid form thereby utilizing its cooling effect.

The gas phase reactor used can operate at temperature region between 60°–115° C., preferably between 70°–115° C. and the reaction pressure between 10–25 bar and the partial pressure of ethylene between 2–20 bar. The mole ratio of hydrogen to ethylene is advantageously lower than in the loop reactor, e.g. for instance between 0–10 mol-%.

The product leaving the gas phase reactor will thus contain the fractions coming from the first and second step loop reactor. The fraction formed in the gas phase reactor has a calculated molecular weight $M_w$, between 300,000–900,000 and the molecular weight distribution between 4.5–12. The proportion of this fraction from the whole end product is preferably between 59–40 wt %. The calculated molecular weight is obtained for instance by calculating with the help of gel permeation chromatography measured from the molecular weight distributions from the fractions produced in the loop reactor and the end product.

The process according to the invention is not limited only to an embodiment in which there is only one gas phase reactor in the way described above. There can be consecutively two or more gas phase reactors in series, when considered necessary for the properties of this product or the adjusting of the process.

The process according to this invention will be described more detailed in the following by referring to the attached figure, which discloses the principal flow graph of the process according to the invention. The loop reactor of the first polymerization step has been marked by reference number 10. The catalyst will be fed from the catalyst tank 11 with the help of the catalyst feeder 12 through the catalyst transfer line 13 to the loop reactor 10. Ethylene from the line 14, low boiling inert hydrocarbon medium from line 15, optionally hydrogen from line 16 and optional comonomer from line 17 are fed to the loop reactor 10 through the line 18. Cocatalyst can be fed either through the line 13 together with the catalyst or separately for instance through the line 18. In the loop reactor 10 the reaction mixture is circulated by suitable circulating means (not shown) and at the same time the polymerizing heat is removed by cooling the reactor or the reaction mixture with the help of the cooling system (not shown).

From the loop reactor 10 the polymer-hydrocarbon mixture is removed preferably directly to the second step loop reactor 20 through the line 21 or optionally with the help of a periodically functioned valve (not shown). In the loop reactor 20 the polymerization is continued by adding a diluent from the line 22, ethylene from the line 23, hydrogen from the line 24 and an optional comonomer from the line 25 through the line 26. To the loop reactor 20 it can be added also optional cocatalyst in an ordinary way (not shown).

From the loop reactor 20 the polymer-hydrocarbon mixture is fed through one or several exhaust valve 27 and the product transfer line 28 to the flash separator 30. The hydrocarbon medium removed from the polymer particles, the remaining monomer and hydrogen are removed from the flash separator 30 either through the line 31 to the recovery unit (not shown) or back to the loop reactor 20 through the line 26. The polymer particles are removed from the flash separator 30 through the removing line 32 to the gas phase reactor 40.

In the lower part of the gas phase reactor 40 there is a bed consisting of polymer particles, which will be kept in a fluidized state in an ordinary way by circulating the gases removed from the top of the reactor through the compressor 42 and the heat exchanger (not shown) to the lower part of the reactor 40 in an ordinary way. The reactor 40 is advantageously, but not necessarily, equipped by a mixer (not shown). To the lower part of the reactor can be led in a well known way ethylene from line 45, optionally comonomer from line 46 and hydrogen from the line 47. The product will be removed from the reactor 40 continually or periodically throgh the transfer line 46 to the recovery system (not shown).

DETAILED DESCRIPTION OF THE PREFERRED EMBODIMENTS

The invention is further illustrated with the following examples. In all examples the catalyst was prepared according to Finnish patent application 942949. Triethylaluminium was used as a cocatalyst.

The first two examples show how the inventive process improves the process performance (less fines) as well as the material performance of a blow molding material (improved weight swell—processability balance).

EXAMPLE 1

Into a loop reactor having a volume of 50 cm$^3$ and operating at the temperature of 60° C. was added 2.7 kg/h of ethylene, 490 g/h of 1-butene, 0.5 g/h of hydrogen and 27 kg/h of propane. Catalyst was added with a rate of 18 g/h. Polymer was removed at a rate of 1.7 kg/h. The polymer slurry withdrawn from the first loop reactor was introduced into another loop reactor having a volume of 500 cm$^3$ and operating at a temperature of 95° C. Additionally, 30 kg/h of ethylene, 67 g/h of hydrogen and 28 kg/h of propane were introduced into the reactor. Polyethylene was removed from the reactor with a rate of 28 kg/h. The fraction of polymer particles particles having a diameter smaller than 100 μm was 7.8% after the second loop reactor. The hydrocarbons were removed from the polymer, which was fed into a gas phase reactor operating at a temperature of 75° C. Also 48 kg/h of ethylene, 1.7 kg/h of 1-butene and 107 g/h of hydrogen were introduced into the gas phase reactor. In total 60 kg/h of polymer having a density of 955 kg/m$^3$ and MFR$_{21}$ of 31 dg/min was removed from the gas phase reactor. The fraction of polymer particles with a diameter samller than 100 μm was 5.2% after the gas phase reactor. A sample of the polymer was pelletized and blown into bottles. The weight swell of the bottles was 99% compared with a commercial reference material. The amount of gels was low and no sign of melt flow irregularities was detected during the bottle blowing. The material was easy to process, as indicated by the low pressure in the blow moulding machine, which was 162 bar.

EXAMPLE 2 (COMPARATIVE)

Into a loop reactor having a volume of 500 cm$^3$ and operating at the temperature of 95° C. was added 29 kg/h of ethylene, hydrogen so that its ratio to ethylene in the reaction mixture was 298 mol/kmol and 26 kg/h of propane. Catalyst was added with a rate of 8.5 g/h. Polyethylene was removed from the reactor at a rate of 27 kg/h. The fraction of polymer particles particles having a diameter smaller than 100 μm was 27.2% after the second loop reactor. The hydrocarbons were removed from the polymer, which was fed into a gas phase reactor operating at a temperature of 75° C. Also 45 kg/h of ethylene, 0.9 kg/h of 1-butene and 65 g/h of hydrogen were introduced into the reactor. In total 63 kg/h of polymer having a density of 956.5 kg/m$^3$ and MFR$_2$ of 31 dg/min was removed from the gas phase reactor. The fraction of polymer particles with a diameter samller than 100 μm was 15.4% after the gas phase reactor. A sample of the polymer was pelletized and blown into bottles. The weight swell of the bottles was 94% compared with a commercial reference material. The amount of gels was low. However, the material was difficult to process, as indicated by the high pressure in the blow molding machine (238 bar).

| Ex. | Fines after loop % | Fines after GPR % | MFR$^{21}$ dg/min | Density kg/m$^3$ | Weight swell % | Pressure bar |
| --- | --- | --- | --- | --- | --- | --- |
| 1 | 7.8 | 5.2 | 31 | 955 | 99 | 162 |
| 2 | 27.2 | 15.4 | 31 | 956.5 | 94 | 238 |

EXAMPLES 3-4

Examples 3 and 4 demonstrate how the film properties (gels, mechanical properties) and the process performance (run stability) can be improved when using the inventive process.

EXAMPLE 3

Into a loop reactor having a volume of 50 cm$^3$ and operating at the temperature of 60° C. was added 2.2 kg/h of ethylene, 431 g/h of 1-butene, 0.2 g/h of hydrogen and 28 kg/h of propane. Catalyst was fed with a rate of 6.5 g/h. Polymer was continuouly removed at a rate of 1.4 kg/h. The polymer slurry withdrawn from the first loop reactor was introduced into another loop reactor having a volume of 500 cm$^3$ and operating at a temperature of 85° C. Additionally, 33 kg/h of ethylene, 87 g/h of hydrogen, 4.6 kg/h of 1-butene and 42 kg/h of propane were introduced into the second loop reactor. Polyethylene was removed from the reactor with a rate of 31 kg/h. The hydrocarbons were removed from the polymer, which was fed into a gas phase reactor operating at the temperature of 75° C. Also 49 kg/h of ethylene, 17 kg/h of 1-butene and 3.4 g/h of hydrogen was introduced in the reactor. 70 kg/h of polymer having a density of 923 kg/m$^3$ and MFR$_{21}$ of 17 dg/min was removed from the gas phase reactor. The process was very stable and a run of three weeks was carried out without difficulties. The polymer was pelletized and blown into a 25 μm film on a pilot film line. The material was easy to process and the amount of gels was low. The blown film had a drop of 1270 g.

EXAMPLE 4 (COMPARATIVE)

Into a loop reactor having a volume of 500 cm$^3$ and operating at the temperature of 80° C. was added 23 kg/h of ethylene, 4.6 kg/h of 1-butene, 29 g/h of hydrogen and 29 kg/h of propane. A polymerization catalyst was added with a rate of 8.5 g/h. Polymer was removed at a rate of 22 kg/h. The hydrocarbons were removed from the polymer, which was fed into a gas phase reactor operating at a temperature of 70° C. Also 37.5 kg/h of ethylene, 14 kg/h of 1-butene and 7.5 g/h of hydrogen were introduced into the reactor. 49 kg/h of polymer having a density of 924.5 kg/m$^3$ and MFR$_{21}$ of 14 dg/min was removed from the gas phase reactor. The process was most of the time unstable. Especially the transfer of the polymer from the loop reactor to the gas phase reactor failed several times during the run. The polymer was pelletized and blown into a 25 μm film on a pilot film line. The amount of gels was very high (4900/m$_2$). The dart drop value was 83 g.

| Ex. | Fines after loop % | Fines after GPR % | MFR$^{21}$ dg/min | Density kg/m$^3$ | Gels num./m$^2$ | Dart drop, g |
| --- | --- | --- | --- | --- | --- | --- |
| 3 | 12.1 | 6.9 | 17 | 923 | 400 | 1270 |
| 4 | 4.0 | 3.0 | 14 | 924.5 | 4900 | 83 |

EXAMPLES 5–6

Examples 5 and 6 demonstrate how the process operation is improved (less fines) and the amount of gels in the product is reduced when using the inventive process configuration. Also, the good mechanical properties of the film obtained by the loop—gas phase process is maintained.

EXAMPLE 5

Into a loop reactor having a volume of 50 cm$^3$ and operating at the temperature of 60° C. was added 2.3 kg/h of ethylene, 430 g/h of 1-butene, 0.7 g/h of hydrogen and 22 kg/h of propane. Catalyst was added with a rate of 11.5 g/h. Polymer was continuously removed at a rate of 1.5 kg/h. The polymer slurry withdrawn from the first loop reactor was introduced into another loop reactor having a volume of 500 cm$^3$ and operating at a temperature of 95° C. Additionally, 31 kg/h of ethylene, 89 g/h of hydrogen and 28 kg/h of propane were introduced into the reactor. Polyethylene was removed from the reactor with a rate of 27 kg/h. The fraction of polymer particles having a diameter smaller than 100 μm was 9.7% after the second loop reactor. The hydrocarbons were removed from the polymer, which was fed into a gas phase reactor operating at a temperature of 75° C. Also 57 kg/h of ethylene, 7 kg/h of 1-butene and 28 g/h of hydrogen were introduced into the reactor. In total 69 kg/h of polymer having a density of 945 kg/m$^3$ and MFR$_{21}$ of 8.5 dg/min was removed from the gas phase reactor. The fraction of polymer particles with a diameter samller than 100 μm was 9.8% after the gas phase reactor. The polymer was pelletized and blown into film. The dart drop of the film was 240 g and the film contained gels approximately 200 gels/m$^2$.

EXAMPLE 6 (COMPARATIVE)

Into a loop reactor having a volume of 500 cm$^3$ and operating at the temperature of 95° C. was fed 26 kg/h of ethylene, 38 g/h of hydrogen and 38 kg/h of propane. A catalyst was introduced with a rate of 12.5 g/h. Polymer was removed from the reactor with a rate of 24 kg/h. The fraction of polymer particles having a diameter smaller than 100 μm was 26.6% after the loop reactor. The hydrocarbons were removed from the polymer, which was fed into a gas phase reactor operating at a temperature of 75° C. Also 45 kg/h of ethylene, 4 kg/h of 1-butene and 24 g/h of hydrogen were introduced into the reactor. In total 61 kg/h of polymer having the density of 948 kg/m$^3$ and MFR$_{21}$ of 7.2 dg/min was removed from the gas phase reactor. The fraction of polymer particles having a diameter smaller than 100 μm was 16.0% after the gas phase reactor. The polymer was pelletized and blown into a film. The dart drop of the film was 221 g and the film contained approximately 600 gels/m$^2$.

| Ex. | Fines after loop % | Fines after GPR % | MFR$^{21}$ dg/min | Density kg/m$^3$ | Gels num./m$^2$ | Dart drop, g |
| --- | --- | --- | --- | --- | --- | --- |
| 5 | 9.7 | 9.8 | 8.5 | 945 | 200 | 240 |
| 6 | 26.6 | 16.0 | 7.2 | 948 | 600 | 221 |

EXAMPLES 7–8

Examples 7 and 8 demonstrate how the process performance is improved (less fines) by using the inventive process. At the same time the very good mechanical properties of the pipe given by the loop-gas phase process are reduced only slightly.

EXAMPLE 7

Into a loop reactor having a volume of 50 cm$^3$ and operating at the temperature of 70° C. was added 1.5 kg/h of ethylene, 80 g/h of 1-butene, 0.7 g/h of hydrogen and 27 kg/h of propane. Catalyst was added with a rate of 15 g/h. Polymer was removed at a rate of 0.9 kg/h. The polymer slurry withdrawn from the first loop reactor was introduced into another loop reactor having a volume of 500 cm$^3$ and operating at a temperature of 95° C. Additionally, 32 kg/h of ethylene, 75 g/h of hydrogen and 34 kg/h of propane were introduced into the reactor. Polyethylene was removed from the reactor with a rate of 29 kg/h. The fraction of polymer particles having a diameter smaller than 100 μm was 21% after the second loop reactor. The hydrocarbons were removed from the polymer, which was fed into a gas phase reactor operating at a temperature of 75° C. Also 41 kg/h of ethylene, 2.6 kg/h of 1-butene and 38 g/h of hydrogen were introduced into the reactor. In total 59 kg/h of polymer having a density of 948 kg/m$^3$ and MFR$_5$ of 0.4 dg/min was removed from the gas phase reactor. The fraction of polymer particles with a diameter samller than 100 μm was 17.2% after the gas phase reactor. The polymer was pelletized and was made into pipe. The notch test at 4.6 MPa gave a value of above 2000 h. A constant tensile load test gave a result indicating a fracture after 600 h (as a comparison, a commercially available reference material gave a result of 350 h in the same test).

EXAMPLE 8 (COMPARATIVE)

Into a loop reactor having a volume of 500 cm$^3$ and operating at the temperature of 95° C. was fed 32 kg/h of ethylene, 60 g/h of hydrogen and 48 kg/h of propane. A catalyst was introduced with a rate of 8.7 g/h. Polyethylene was removed from the reactor with a rate of 31 kg/h. The fraction of polymer particles having a diameter smaller than 100 μm was 34.6% after the loop reactor. The hydrocarbons were removed from the polymer, which was fed into a gas phase reactor operating at a temperature of 75° C. Also 47 kg/h of ethylene, 2.7 kg/h of 1-butene and 15 g/h of hydrogen were introduced into the reactor. In total 63 kg/h of polymer having the density of 947.7 kg/m$^3$ and MFR$_5$ of 0.37 dg/min was removed from the gas phase reactor. The fraction of polymer particles having a diameter smaller than 100 μm was 23.6% after the gas phase reactor. The polymer was pelletized and made into a pipe. A constant tensile load test of the material gave a result indicating no fracture after 700 h.

| Ex. | Fines after loop % | Fines after GPR % | MFR[21] dg/min | Density kg/m$^3$ | CTL h | Notch test, h (4.6 MPa) |
|---|---|---|---|---|---|---|
| 7 | 21.0 | 17.2 | 0.4 | 948 | 600 | 2000 |
| 8 | 34.6 | 23.6 | 0.37 | 947.7 | >700 | not analyzed |

The above examples are not meant to limit the scope of the invention. Obvious variations of the examples and the invention as described herein are deemed to be encompassed by the appended claims.

We claims:

1. A process for producing polyethylene compositions in the presence of a catalytic system of ethylene polymerizing catalyst and cocatalyst in a multistage, continuous reaction sequence consisting of successive liquid phase and gas phase polymerizations, comprising polymerizing ethylene and optionally hydrogen and comonomer in a first loop reactor in a low boiling hydrocarbon medium in the presence of ethylene polymerizing catalyst and cocatalyst, removing the resultant reaction mixture from said first loop reactor and transferring said resultant mixture to a second loop reactor, continuing to polymerize the ethylene, by adding ethylene, hydrogen and optionally inert hydrocarbon, comonomers and cocatalysts to said second loop reactor, the residence time being at least 10 minutes, removing the reaction mixture obtained in said second loop reactor and separating the reaction medium and transferring the polymer to a gas phase reactor, continuing the polymerization in said gas phase reactor in the presence of added ethylene and optionally hydrogen, comonomers and cocatalysts to obtain an end product, wherein the residence time and reaction temperature in said first loop reactor is such that the polymer formed therein has a melt index lower than the melt index of the polymer formed in the second loop reactor and the proportion of the ethylene polymer formed in said first loop reactor to said end product is between 1–20 wt %.

2. A process according to claim 1, wherein the catalyst is fed only to the said first polymerization step and the cocatalyst is fed to said first polymerization step and optionally to the second and/or third step loop reactor and/or gas phase reactor.

3. A process according to claim 1, wherein that in the first polymerization step the conditions of the polymerization are chosen so that the melt index MFR$_2$ of the produced ethylene polymer is between 0.01–50 and in the second polymerization step the conditions are chosen so that the melt index MFR$_2$ of the ethylene polymer fraction is between 10–2000.

4. A process according to claim 1, wherein the relation of the molecular weight of the ethylene polymer produced in the first polymerization step to the molecular weight of the end product removed from said third polymerization step is between 0.25–5.

5. A process according to claim 1, wherein the reaction temperature in said first loop reactor is between 20°–100° C. and the residence time is between 10 minutes to 2 hours.

6. A process according to claim 1, wherein inert hydrocarbon in said first loop reactor is propane and the reaction pressure and reaction temperature in said second loop reactor are chosen so that the reaction fluid formed by inert hydrocarbon, monomer and hydrogen is in the supercritical state.

7. A process according to claim 1, wherein in said first loop reactor produces polyethylene having a molecular weight between 150,000–600,000 and a density between 940–970 kg/m$^3$, and said second loop reactor produces ethylene polymer having a molecular weight between 500–50,000 and a density between 950–980 kg/m$^3$.

8. A process according to claim 1, wherein in said first loop reactor produces ethylene polymer having a molecular weight less than 400,000.

9. A process according to claim 1, wherein an amount of $C_4$–$C_8$ alpha olefins is fed as a commoner in the first polymerization step to the loop reactor so that the density of the product produced in said first loop reactor is between 910–950 kg/m$^3$.

10. A process according to claim 9, wherein said comonomer is selected from the group consisting of 1-butene, 1-hexane, 4-methyl-1-pentene, 1-octene and mixtures thereof.

11. A process according to claim 1, wherein $C_4$–$C_8$ alphaolefins are fed as a comonomer to the gas reactor of the third polymerization step.

12. A process according to claim 1, wherein propane is fed into said gas phase reactor through a mixer in the liquid state, the gas state or a mixture thereof.

13. A process according to claim 5, wherein the reaction temperature in said first loop reactor is between 40°–80° C.

14. A process for producing polyethylene compositions in the presence of a catalytic system of ethylene polymerizing catalyst and cocatalyst in a multistage, continuous reaction sequence consisting of successive liquid phase and gas phase polymerizations, comprising:

polymerizing ethylene and a sufficient amount of a $C_4$–$C_8$ alpha olefin commoner and optionally hydrogen in a first loop reactor in a low boiling hydrocarbon medium in the presence of ethylene polymerizing catalyst and cocatalyst to form a reaction mixture having a density of between 910–950 kg/m$^3$, removing the resultant reaction mixture from said first loop reactor and transferring said resultant mixture to a second loop reactor, continuing to polymerize the ethylene, by adding ethylene, hydrogen and optionally inert hydrocarbon, comonomers and cocatalysts to said second loop reactor, the residence time being at least 10 minutes, removing the reaction mixture obtained in said second loop reactor and separating the reaction medium and transferring the polymer to a gas phase reactor, continuing to polymerize the ethylene in said gas phase reactor in the presence of added ethylene and optionally hydrogen, comonomers and cocatalysts to obtain an end product, wherein the residence time and reaction temperature in said first loop reactor is such that the polymer formed therein has a melt index lower than the melt index of polymer first formed in the second loop reactor and the proportion of the ethylene polymer formed in said first loop reactor to said end product is between 1–20 wt %.

* * * * *